US012775226B2

(12) United States Patent
Wada et al.

(10) Patent No.: US 12,775,226 B2
(45) Date of Patent: Oct. 27, 2026

(54) ROTATION DEVICE AND IMAGE FORMING APPARATUS FOR INHIBITING VIBRATION AT A RECESSED PORTION OF A ROTATOR

(71) Applicant: FUJIFILM Business Innovation Corp., Tokyo (JP)

(72) Inventors: Tomohiro Wada, Kanagawa (JP); Yoko Miyamoto, Kanagawa (JP); Toshiaki Baba, Kanagawa (JP); Kazuyoshi Hagiwara, Kanagawa (JP); Satoshi Shigezaki, Kanagawa (JP); Satoshi Ezawa, Kanagawa (JP); Ko Umenai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/320,348

(22) Filed: May 19, 2023

(65) Prior Publication Data

US 2024/0168411 A1 May 23, 2024

(30) Foreign Application Priority Data

Nov. 22, 2022 (JP) ................................. 2022-186481

(51) Int. Cl.
*G03G 15/16* (2006.01)

(52) U.S. Cl.
CPC ..... *G03G 15/1605* (2013.01); *G03G 15/1655* (2013.01); *G03G 2215/0193* (2013.01)

(58) Field of Classification Search
CPC ........... G03G 15/1605; G03G 15/1655; G03G 15/166; G03G 2215/00409; G03G 2215/0193
See application file for complete search history.

(56) References Cited

U.S. PATENT DOCUMENTS 6,151,477 A * 11/2000 Takeuchi ........... G03G 15/1685 399/303
8,254,817 B2 8/2012 Kamijo et al.
(Continued)

FOREIGN PATENT DOCUMENTS

| | | | |
|---|---|---|---|
| JP | H04-507308 | A | 12/1992 |
| JP | 2010-224412 | A | 10/2010 |
| JP | 5278687 | B2 | 9/2013 |

OTHER PUBLICATIONS

Aug. 4, 2026 Office Action issued in Japanese Patent Application No. 2022-186481.

*Primary Examiner* — Stephanie E Bloss
*Assistant Examiner* — Laura Roth
(74) *Attorney, Agent, or Firm* — Oliff PLC

(57) ABSTRACT

A rotation device includes a rotator having a recessed portion on its outer circumferential surface. The rotator rotates in a predetermined rotation direction while a contact unit engages a portion of the outer circumferential surface spanning from an upstream end to a downstream end of the recessed portion. A contact surface is provided at an upstream end portion of this range. The contact surface engages the contact unit at a second engagement depth that is less than a first engagement depth at a downstream portion of the range. This arrangement inhibits the contact unit or the rotator from rapidly restoring to an original state as the contact unit transitions past the recessed portion, thereby reducing vibration. The rotation device may be incorporated into an image forming apparatus that transfers toner images to a recording medium.

12 Claims, 8 Drawing Sheets

(56) References Cited

U.S. PATENT DOCUMENTS

| | | | | |
|---|---|---|---|---|
| 2010/0226699 | A1 | 9/2010 | Kamijo et al. | |
| 2022/0082979 | A1* | 3/2022 | Yoshioka | B65H 29/044 |
| 2022/0097426 | A1* | 3/2022 | Baba | B41J 15/046 |
| 2022/0107589 | A1* | 4/2022 | Tsutsumi | G03G 15/1615 |
| 2022/0107592 | A1* | 4/2022 | Yuasa | G03G 15/0805 |
| 2023/0123189 | A1* | 4/2023 | Baba | B41J 13/106<br>347/101 |
| 2023/0123692 | A1* | 4/2023 | Yoshioka | G03G 15/1615<br>271/8.1 |

* cited by examiner

ROTATION DEVICE AND IMAGE FORMING APPARATUS FOR INHIBITING VIBRATION AT A RECESSED PORTION OF A ROTATOR

CROSS-REFERENCE TO RELATED APPLICATIONS

This application is based on and claims priority under 35 USC 119 from Japanese Patent Application No. 2022-186481 filed Nov. 22, 2022.

BACKGROUND

(i) Technical Field

The present disclosure relates to a rotation device and an image forming apparatus.

(ii) Related Art

Japanese Patent No. 5278687 discloses a second transfer roller that includes a transfer material holding mechanism for holding a transfer material.

SUMMARY

It is thought that a rotation device includes a rotator that includes a recessed portion formed on an outer circumferential surface and that rotates in a predetermined rotation direction, and a contact unit that comes into contact with a portion of the outer circumferential surface in a range from an upstream end to a downstream end of the recessed portion in the rotation direction at a predetermined engagement depth, and the engagement depth is constant over the entire range.

As for the rotation device, the contact unit or the rotator that deforms is rapidly restored to an original state when the contact unit that is in contact with the outer circumferential surface of the rotator at the predetermined engagement depth is separated therefrom at the recessed portion.

Aspects of non-limiting embodiments of the present disclosure relate to the case where a contact unit or a rotator that deforms is inhibited from being rapidly restored to an original state, unlike the case where an engagement depth at which a contact unit comes into contact with a portion of an outer circumferential surface in a range from an upstream end to a downstream end of a recessed portion in a rotation direction is constant over the entire range.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a rotation device including a rotator that includes a recessed portion formed on an outer circumferential surface and that rotates in a predetermined rotation direction; a contact unit that comes into contact with a portion of the outer circumferential surface in a range from an upstream end to a downstream end of the recessed portion in the rotation direction at a predetermined engagement depth; and a contact surface that is formed at an upstream end portion in the range in the rotation direction and that comes into contact with the contact unit at a second engagement depth less than a first engagement depth at a portion downstream of the upstream end portion.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will hereinafter be described by way of example with reference to the figures.

Image Forming Apparatus 10

Figure 1:
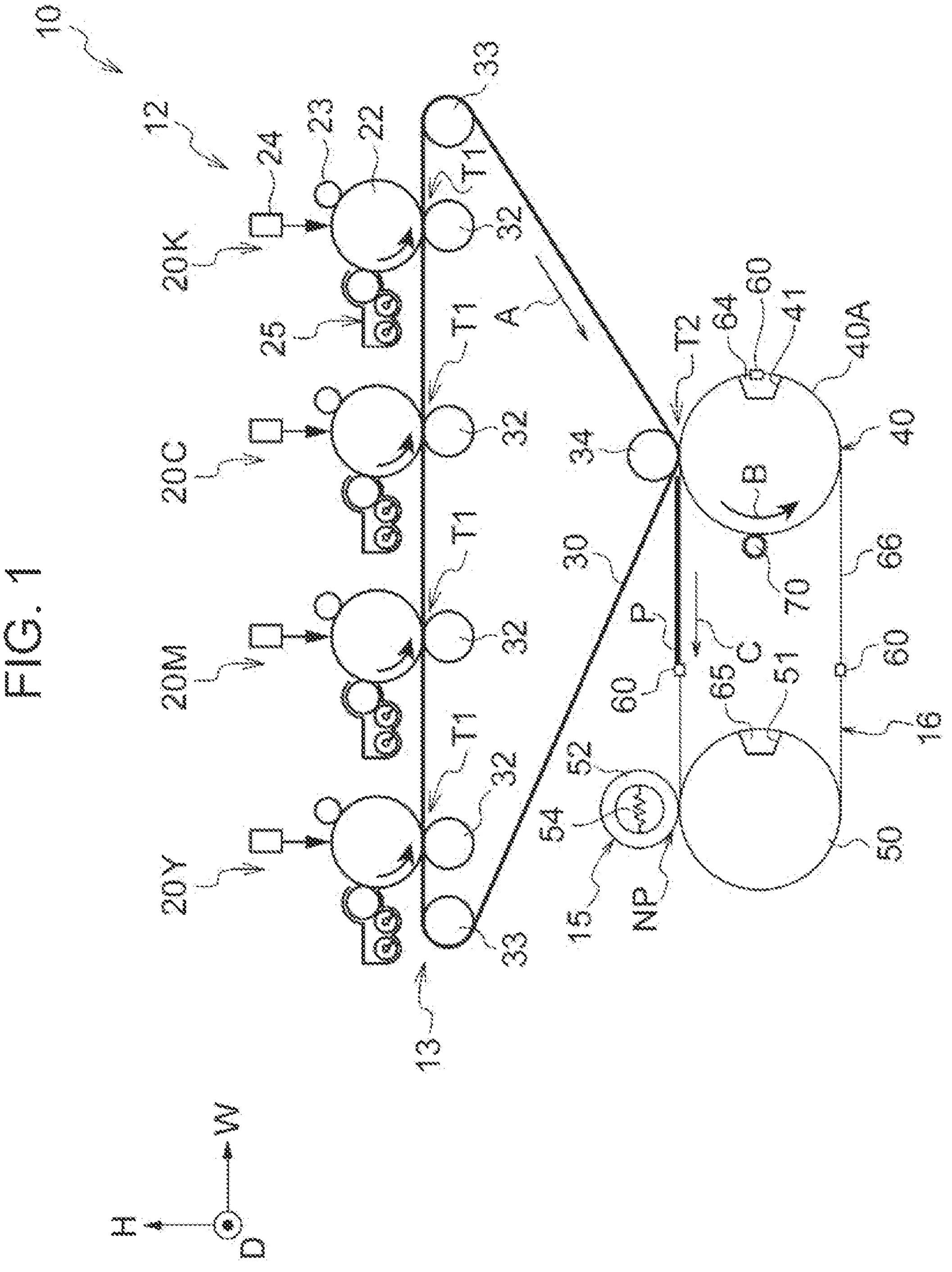
FIG. 1 schematically illustrates an image forming apparatus according to the present exemplary embodiment.

The structure of an image forming apparatus 10 according to the present exemplary embodiment will be described. FIG. 1 schematically illustrates the structure of the image forming apparatus 10 according to the present exemplary embodiment. In the figures, an arrow H represents the vertical direction and an up-down direction of the apparatus, an arrow W represents the horizontal direction and a width direction of the apparatus, and an arrow D represents the horizontal direction and a depth direction of the apparatus (a front-rear direction of the apparatus). Ratios of the dimensions of components illustrated in the figures in the H direction, the W direction, and the D direction differ from actual ratios of the dimensions in some cases.

The image forming apparatus 10 illustrated in FIG. 1 forms toner images (examples of an image) on a recording medium P. Specifically, the image forming apparatus 10 includes an image forming unit 12, a fixing device 15, and a transport mechanism 16. The components (the image forming unit 12, the fixing device 15, and the transport mechanism 16) of the image forming apparatus 10 will now be described.

Image Forming Unit 12

The image forming unit 12 forms the toner images on the recording medium P by using an electrophotographic system. Specifically, as illustrated in FIG. 1, the image forming unit 12 includes toner image forming units 20 that form the toner images and a transfer device 13 that transfers the toner images that are formed by the toner image forming units 20 to the recording medium P.

Toner Image Forming Units 20

The multiple toner image forming units 20 illustrated in FIG. 1 form the toner images in colors. According to the present exemplary embodiment, the toner image forming units 20 for four colors of yellow (Y), magenta (M), cyan (C), and black (K) in total are provided. Symbols of (Y), (M), (C), and (K) illustrated in FIG. 1 represent components for the respective colors described above.

The toner image forming units 20 for the respective colors have the same structure except for toner to be used. Accordingly, the components of the toner image forming unit 20(K) as a representative of the toner image forming units 20 for the respective colors are designated by reference characters in FIG. 1.

Specifically, the toner image forming units 20 for the respective colors include photoconductor members 22 that rotate in a direction (for example, a counterclockwise direction in FIG. 1). The toner image forming units 20 for the respective colors also include chargers 23, exposure devices 24, and developing devices 25.

As for the toner image forming units 20 for the respective colors, the chargers 23 charge the photoconductor members 22. The exposure devices 24 expose the photoconductor members 22 that are charged by the chargers 23 to light and form electrostatic latent images on the photoconductor members 22. The developing devices 25 develop the electrostatic latent images that are formed on the photoconductor members 22 by using the exposure devices 24 and form the toner images.

Transfer Device 13

The transfer device 13 illustrated in FIG. 1 is an example of a rotation device and transfers the toner images that are formed by the toner image forming units 20 to the recording medium P. Specifically, the transfer device 13 performs first transfer by which the toner images on the photoconductor members 22 for the respective colors are stacked on a transfer belt 30 that serves as an intermediate transfer body and second transfer by which the stacked toner images are transferred to the recording medium P. As illustrated in FIG. 1, the transfer device 13 includes the transfer belt 30, first transfer rollers 32, a transfer cylinder 40, and a cleaning brush 70. The transfer cylinder 40 is an example of a rotator. The transfer belt 30 and the cleaning brush 70 are examples of a contact unit.

The first transfer rollers 32 transfer the toner images on the photoconductor members 22 for the respective colors to the transfer belt 30 at first transfer positions T1 between the photoconductor members 22 and the first transfer rollers 32. According to the present exemplary embodiment, a first transfer electric field is applied between the first transfer rollers 32 and the photoconductor members 22, and the toner images that are formed on the photoconductor members 22 are consequently transferred to the transfer belt 30 at the first transfer positions T1.

The toner images on the photoconductor members 22 for the respective colors are transferred to an outer circumferential surface of the transfer belt 30. As illustrated in FIG. 1, the transfer belt 30 has no ends and is wound around multiple rollers 33 and a facing roller 34 so as to have an inverted triangle shape in a front view (when viewed in the depth direction of the apparatus). At least one of the multiple rollers 33 is rotated, and the transfer belt 30 consequently turns in the direction of an arrow A.

Figure 2:
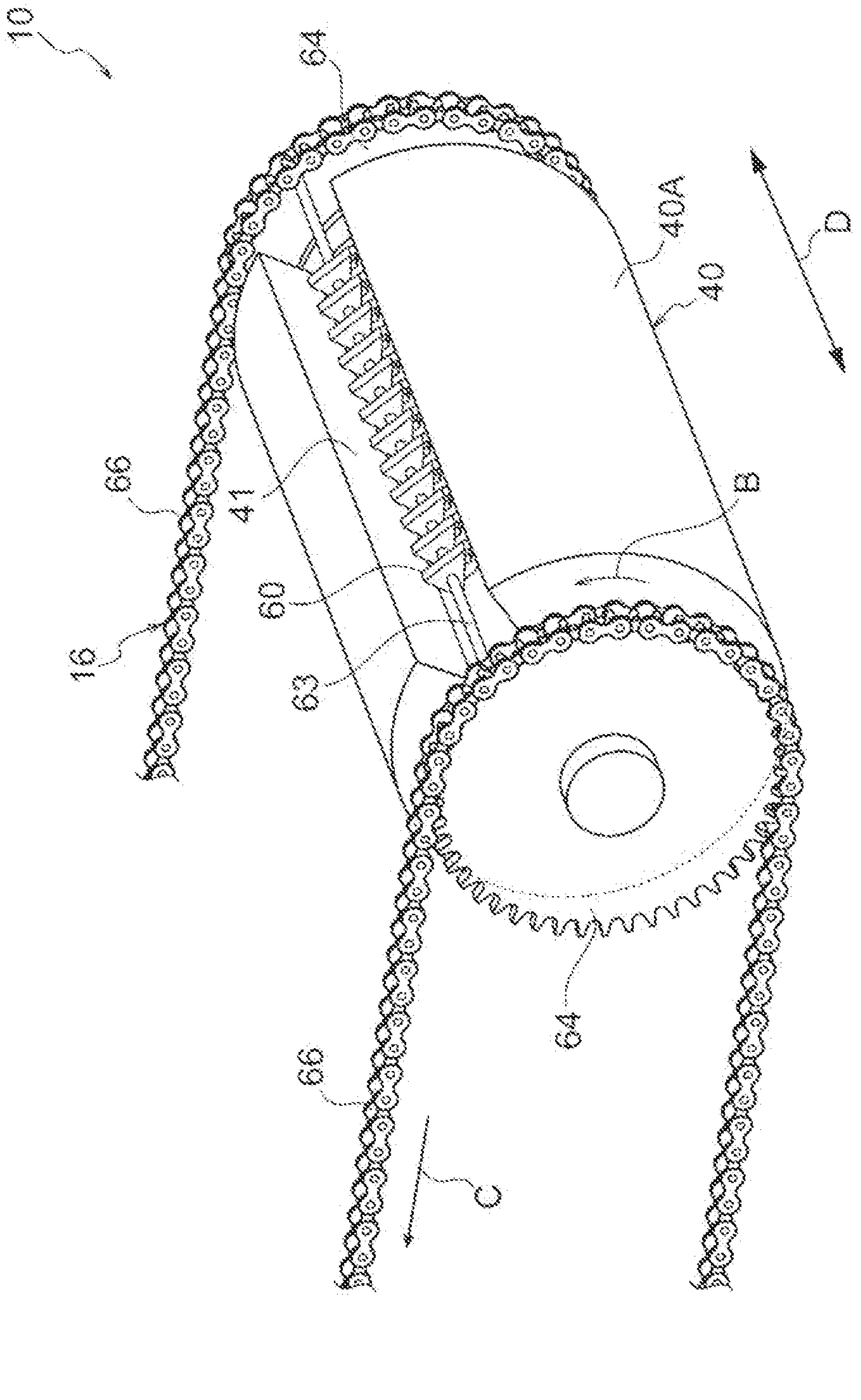
FIG. 2 is a perspective view of the structure of the vicinity of a transfer cylinder according to the present exemplary embodiment.

The transfer cylinder 40 is an example of the rotator, includes a recessed portion 41 that is formed on an outer circumferential surface 40A as illustrated in FIG. 1 and FIG. 2, and rotates in a rotation direction B. The rotation direction B is an example of a predetermined rotation direction. The recessed portion 41 is elongated in the axial direction of the transfer cylinder 40 and has a depth in a radial direction of the transfer cylinder 40.

As illustrated in FIG. 1, the transfer cylinder 40 is disposed below the transfer belt 30 and faces the transfer belt 30. As for the transfer cylinder 40, a portion of the outer circumferential surface 40A in a range (referred to below as a contact range 46) from an upstream end 41A to a downstream end 41B of the recessed portion 41 in the rotation direction comes into contact with the transfer belt 30 (see FIG. 4). Specifically, the upstream end 41A and the downstream end 41B correspond to end portions near an opening of the recessed portion 41 (that is, outer portions of the transfer cylinder 40 in the radial direction).

Figure 4:
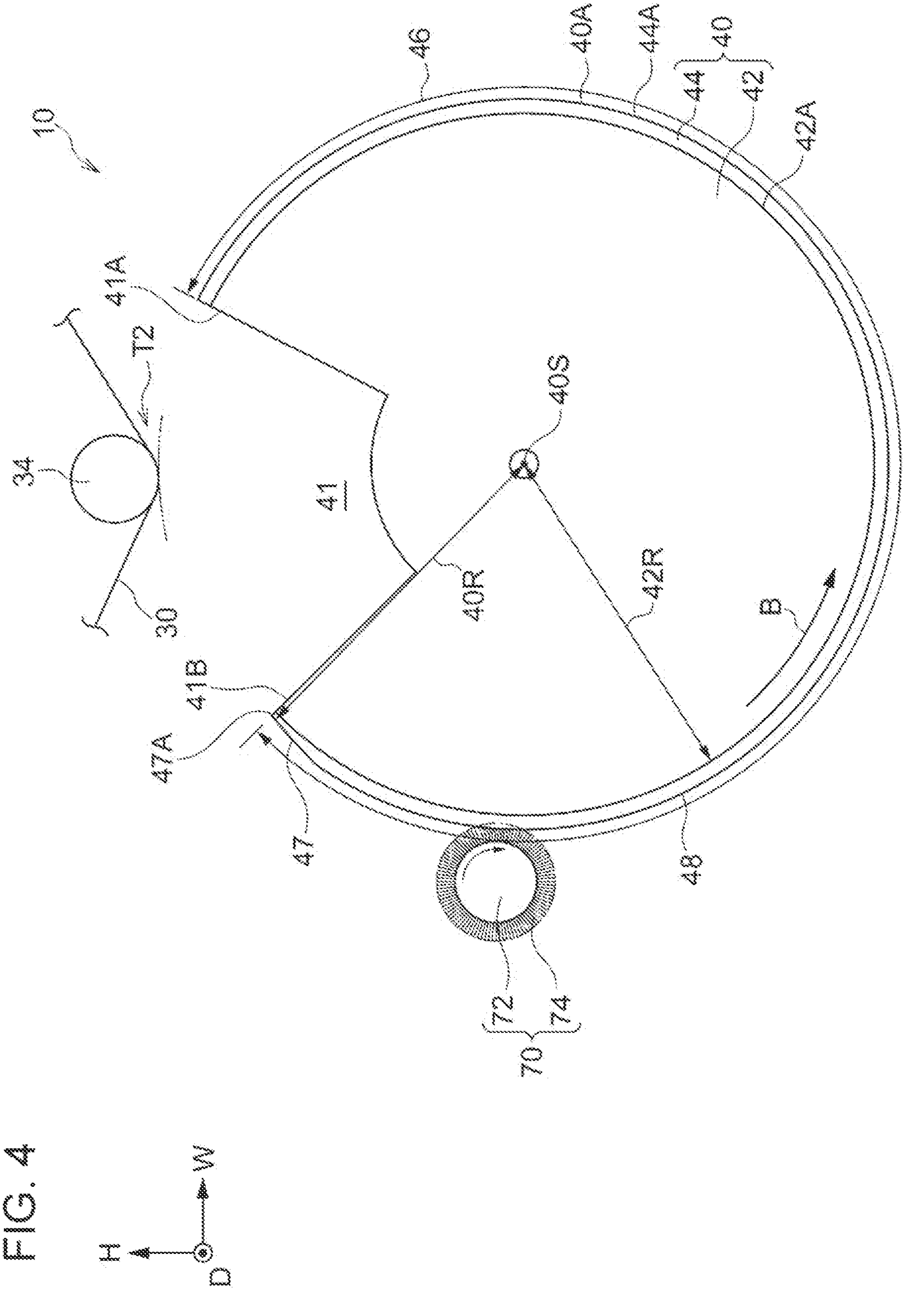
FIG. 4 schematically illustrates a cleaning brush and the transfer cylinder according to the present exemplary embodiment.

Specifically, as illustrated in FIG. 4, the transfer cylinder 40 includes a cylinder body 42 and an elastic layer 44. The cylinder body 42 is an example of a rotator body. The elastic layer 44 is an example of a wound portion.

The cylinder body 42 includes the recessed portion 41 that is formed on a cylindrical surface 42A. Specifically, the cylinder body 42 has a substantially circular shape in a side view and includes the recessed portion 41 on a portion thereof in a circumferential direction. As illustrated in FIG. 2, grippers 60 and mount members 63 of the transport mechanism 16 described later are contained in the recessed portion 41. The cylinder body 42 is composed of, for example, a metal material such as stainless steel or aluminum.

As illustrated in FIG. 4, the elastic layer 44 is wound around the cylindrical surface 42A of the cylinder body 42 in the contact range 46. The outer circumferential surface 40A of the transfer cylinder 40 is formed by using an outer circumferential surface 44A of the elastic layer 44. The elastic layer 44 is composed of, for example, foam rubber. According to the present exemplary embodiment, the elastic layer 44 is separably provided on the cylinder body 42.

As illustrated in FIG. 2, two sprockets 64 are disposed at both ends of the transfer cylinder 40 in the axial direction. The two sprockets 64 are disposed coaxially with the transfer cylinder 40. The cylinder body 42 is rotated in the rotation direction B by using a drive unit (not illustrated), and the transfer cylinder 40 consequently rotates in the rotation direction B together with the two sprockets 64.

According to the present exemplary embodiment, the transfer belt 30 and the transfer cylinder 40 transport the recording medium P with the recording medium P interposed therebetween at a second transfer position T2 (see FIG. 1). A second transfer electric field is applied between the facing roller 34 and the transfer cylinder 40, and the toner images that are transferred to the transfer belt 30 are consequently transferred to the recording medium P at the second transfer position T2. The grippers 60 and the mount members 63 described later hold the recording medium P and are contained in the recessed portion 41 when passing through the second transfer position T2 so as not to come into contact with the transfer belt 30.

Figure 5:
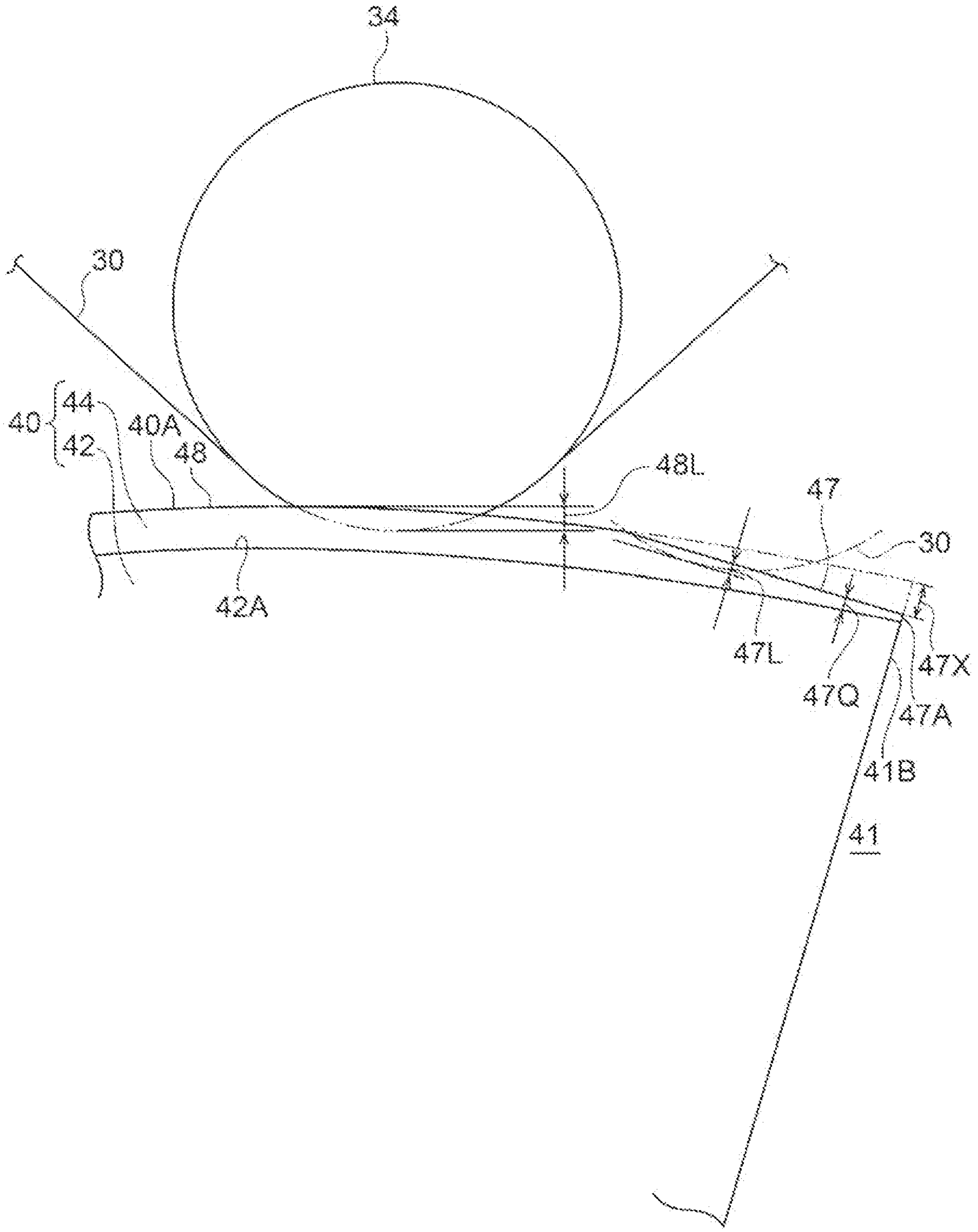
FIG. 5 schematically illustrates an enlarged view of a transfer belt, a facing roller, and the transfer cylinder according to the present exemplary embodiment.

The transfer belt 30 comes into contact with a portion of the transfer cylinder 40 in the contact range 46 at a predetermined engagement depth (see FIG. 5). Consequently, the transfer cylinder 40 (specifically, the elastic layer 44), the transfer belt 30, and the facing roller 34 elastically deform. Assuming that the transfer belt 30, the facing roller 34, and the transfer cylinder 40 do not elastically deform, the engagement depth is equal to a length the transfer belt 30 and the facing roller 34 overlap the transfer cylinder 40 when viewed in the depth direction of the apparatus (see FIG. 5). The length is a length in the radial direction of the transfer cylinder 40.

According to the present exemplary embodiment, the degree of deformation of the transfer cylinder 40 (specifically, the elastic layer 44) is higher than the degree of deformation of the transfer belt 30 and the facing roller 34.

When the recessed portion 41 of the transfer cylinder 40 is located at the second transfer position T2 (when the recessed portion 41 faces the transfer belt 30), the transfer belt 30 and the facing roller 34 that deform are restored to an original state.

The transfer cylinder 40 has a contact surface 47 that comes into contact with the transfer belt 30 in the contact range 46. A specific structure of the contact surface 47 will be described later. A specific structure of the cleaning brush 70 will be described later.

Fixing Device 15

According to the present exemplary embodiment, the fixing device 15 fixes the toner images that are transferred to the recording medium P by using the transfer cylinder 40 to the recording medium P. Specifically, as illustrated in FIG. 1, the fixing device 15 includes a fixing cylinder 50, and a heat roller 52.

As for the fixing device 15, the heat roller 52 is disposed above the fixing cylinder 50. The heat roller 52 contains a heat source 54 such as a halogen lamp.

The fixing cylinder 50 includes a recessed portion 51 on an outer circumferential surface. The recessed portion 51 is formed on a portion of the outer circumferential surface of the fixing cylinder 50 in a circumferential direction. The recessed portion 51 is elongated in the axial direction of the fixing cylinder 50 and has a depth in the radial direction of the fixing cylinder 50. The grippers 60 and the mount members 63 described later are contained in the recessed portion 51. Consequently, the grippers 60 and the mount members 63 do not come into contact with the heat roller 52 when passing through a fixing position NP illustrated in FIG. 1.

Two sprockets 65 are disposed at both ends of the fixing cylinder 50 in the axial direction. The two sprockets 65 are disposed coaxially with the fixing cylinder 50 and rotate together with the fixing cylinder 50.

As for the fixing device 15, the heat roller 52 and the fixing cylinder 50 transport the recording medium P with the recording medium P interposed therebetween at the fixing position NP, heat and press the recording medium P, and consequently fix the toner images that are transferred to the recording medium P to the recording medium P.

Transport Mechanism 16

The transport mechanism 16 illustrated in FIG. 1 transports the recording medium P. As illustrated in FIG. 1 and FIG. 2, the transport mechanism 16 includes two chains 66 and the grippers 60 that are examples of a holding member. In FIG. 1, one of the two chains 66 is illustrated, and an illustration of the chain 66 and the grippers 60 is simplified.

As illustrated in FIG. 1, the two chains 66 are annular. As illustrated in FIG. 2, the two chains 66 are arranged at an interval in the depth direction (the direction of the arrow D in the figure) of the apparatus. The two chains 66 are wound around the respective sprockets 64 that are disposed at both ends of the transfer cylinder 40 in the axial direction and the respective sprockets 65 (see FIG. 1) that are disposed at both ends of the fixing cylinder 50 in the axial direction. The transfer cylinder 40 and the two sprockets 64 are rotated in the rotation direction B (the direction of an arrow B) together, and the chains 66 consequently turn in a circumferential direction C (the direction of an arrow C).

As illustrated in FIG. 2, the mount members 63 on which the grippers 60 are mounted extend between the two chains 66 in the depth direction of the apparatus. The multiple mount members 63 are fixed to the two chains 66 at a predetermined interval in the circumferential direction C in which the chains 66 turn.

Figure 3:
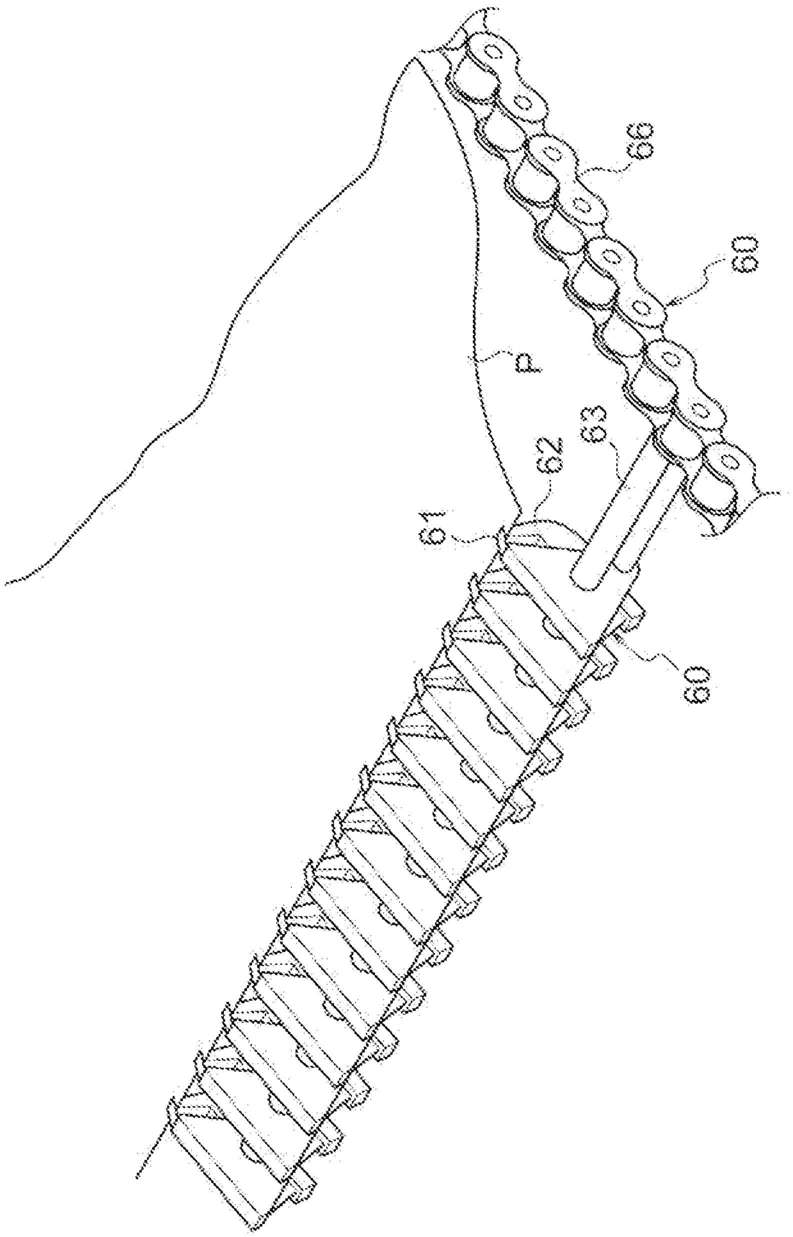
FIG. 3 is a perspective view of grippers according to the present exemplary embodiment.

As illustrated in FIG. 2, the multiple grippers 60 are mounted on the mount members 63 at a predetermined interval in the depth direction of the apparatus. The grippers 60 function as the holding member that holds a leading edge portion of the recording medium P. Specifically, as illustrated in FIG. 3, each gripper 60 includes a pawl 61 and a pawl base 62. The gripper 60 holds the recording medium P by interposing the leading edge portion of the recording medium P between the pawl 61 and the pawl base 62. As for the gripper 60, for example, the pawl 61 is pressed against the pawl base 62 by using, for example, a spring, and the pawl 61 opens or closes with respect to the pawl base 62 by using, for example, a cam action.

As for the transport mechanism 16, as illustrated in FIG. 3, the grippers 60 hold the leading edge portion of the recording medium P that is fed from a container unit (not illustrated) that contains the recording medium P. The chains 66 turn in the circumferential direction C, and the grippers 60 that hold the leading edge portion of the recording medium P consequently transport the recording medium P and pass through the second transfer position T2 and the fixing position NP. The toner images that are stacked on and first-transferred to the transfer belt 30 at the first transfer positions T1 for the respective colors are second-transferred to the recording medium P at the second transfer position T2. The toner images that are second-transferred to the recording medium P are fixed to the recording medium P at the fixing position NP.

The grippers 60 are contained in the recessed portion 41 that is formed on the outer circumferential surface of the transfer cylinder 40 together with the mount members 63 when passing through the second transfer position T2 and are contained in the recessed portion 51 that is formed on the outer circumferential surface of the fixing cylinder 50 together with the mount members 63 when passing through the fixing position NP.

Cleaning Brush 70

The cleaning brush 70 illustrated in FIG. 4 is an example of the contact unit and is an example of a removing unit and cleans the outer circumferential surface 40A of the transfer cylinder 40. Specifically, the cleaning brush 70 removes foreign substances (such as toner and powder of the recording medium P) that adhere to the outer circumferential surface 40A of the transfer cylinder 40.

Specifically, the cleaning brush 70 includes a shaft member 72 and a brush member 74 that is disposed around the shaft member 72. The brush member 74 extends over the entire circumference of the shaft member 72 and contains fibers that radially extend outward from the shaft member 72 in the radial direction. Examples of the fibers include resin fibers such as polyethylene terephthalate (PET) fibers. A part of the brush member 74 in a circumferential direction comes into contact with the outer circumferential surface 40A of the transfer cylinder 40.

The transfer cylinder 40 rotates with the brush member 74 being in contact with the outer circumferential surface 40A of the transfer cylinder 40, and the cleaning brush 70 consequently removes the foreign substances that adhere to the outer circumferential surface 40A of the transfer cylinder 40.

Figure 6:
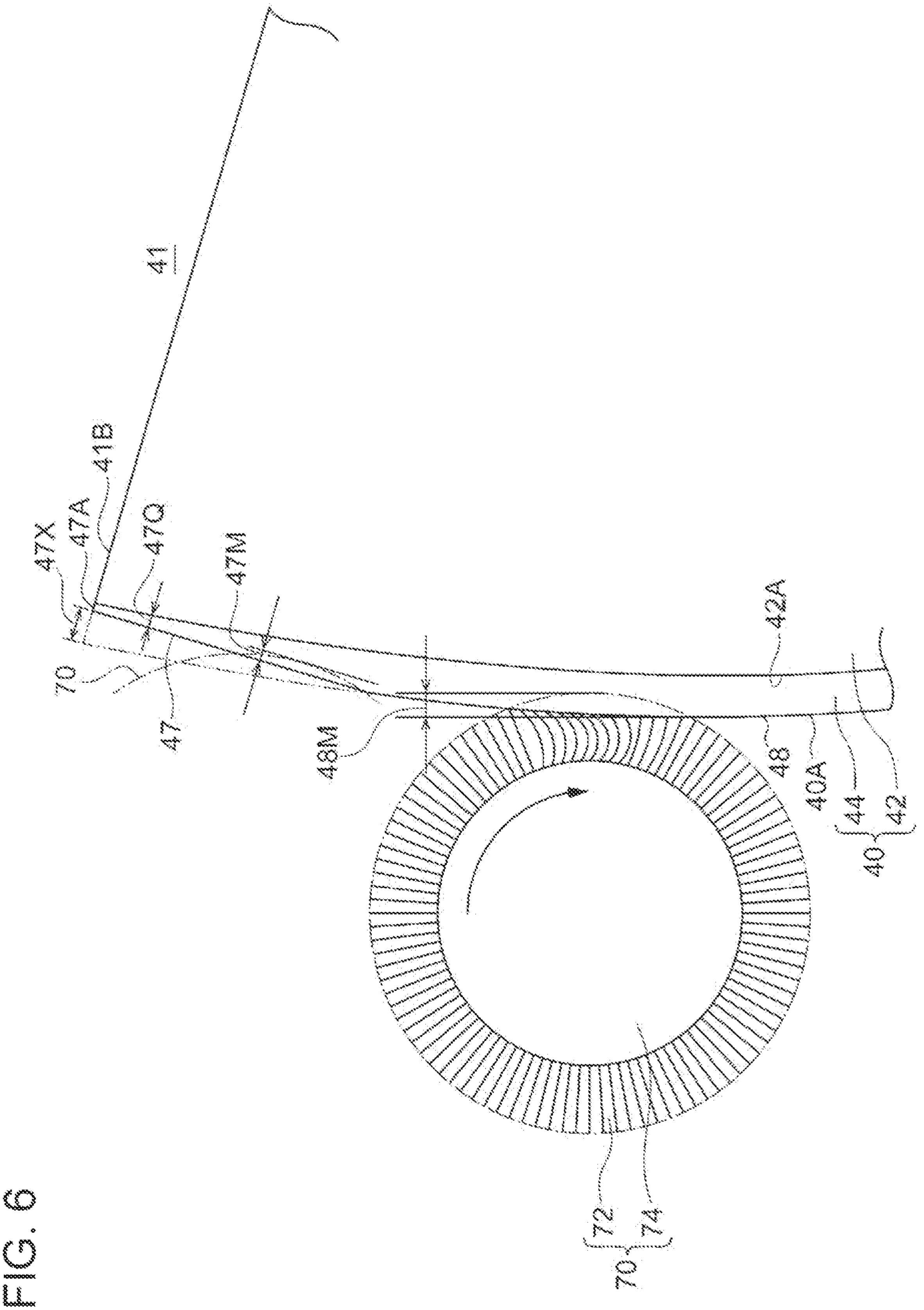
FIG. 6 schematically illustrates an enlarged view of the cleaning brush and the transfer cylinder according to the present exemplary embodiment.

The cleaning brush 70 comes into contact with the transfer cylinder 40 in the contact range 46 at a predetermined engagement depth (see FIG. 6). Consequently, the brush member 74 of the cleaning brush 70 elastically deforms. The brush member 74 of the cleaning brush 70 that deforms is restored to an original state when the recessed portion 41 of the transfer cylinder 40 faces the cleaning brush 70. Assuming that the cleaning brush 70 and the transfer cylinder 40 do not elastically deform, the engagement depth is equal to a length the cleaning brush 70 overlaps the transfer cylinder 40 when viewed in the depth direction of the apparatus (see FIG. 6). The length is a length in the radial direction of the transfer cylinder 40.

Contact Surface 47

As illustrated in FIG. 4, the contact surface 47 is formed at an upstream end portion in the contact range 46 in the rotation direction. The transfer belt 30 comes into contact with the contact surface 47 at a second engagement depth 47L (see FIG. 5) less than a first engagement depth 48L (see FIG. 5) at a portion (referred to below as a downstream portion 48) downstream of the upstream end portion. The cleaning brush 70 comes into contact with the contact surface 47 at a second engagement depth 47M (see FIG. 6) less than a first engagement depth 48M (see FIG. 6) at the downstream portion 48.

As for the contact surface 47, a diameter 40R (see FIG. 4) of the transfer cylinder 40 from a rotation center 40S gradually decreases in a direction toward an upstream portion in the rotation direction B. According to the present exemplary embodiment, the diameter 40R (see FIG. 4) is constant at the downstream portion 48 in the contact range 46.

As for the contact surface 47, a difference 47X between the diameter at an upstream end 47A in the rotation direction B and the diameter at the downstream portion 48 is larger than the first engagement depths 48L and 48M. Accordingly, the contact surface 47 does not come into contact with the transfer belt 30 or the cleaning brush 70 at least at the upstream end 47A. According to the present exemplary embodiment, the contact surface 47 does not come into contact with the transfer belt 30 or the cleaning brush 70 at a portion downstream of the upstream end 47A in the rotation direction B.

As for the elastic layer 44, a distance 47Q between the outer circumferential surface 44A and the cylindrical surface 42A gradually decreases in the direction toward the upstream portion in the rotation direction B in a region in which the contact surface 47 is formed. Specifically, the thickness of the elastic layer 44 gradually decreases in the direction toward the upstream portion in the rotation direction B in the region in which the contact surface 47 is formed.

Accordingly, the contact surface 47 is an inclined surface that gradually extends downward in the direction toward the upstream portion in the rotation direction B with respect to the cylindrical surface 42A of the cylinder body 42. For example, an inclination angle with respect to the cylindrical surface 42A of the contact surface 47 is no less than 5° and no more than 20°. The distance 47Q is a distance in the radial direction of the transfer cylinder 40.

Actions According to Present Exemplary Embodiment

According to the present exemplary embodiment, the transfer belt 30 and the cleaning brush 70 come into contact with the contact surface 47 at the second engagement depths 47L and 47M less than the first engagement depths 48L and 48M at the downstream portion 48 in the contact range 46 as described above.

In this way, the transfer belt 30, the cleaning brush 70, and the transfer cylinder 40 may be inhibited from vibrating. As a result, a transfer failure may be inhibited from occurring at the first transfer positions T1 and the second transfer position T2, the foreign substances that adhere to the cleaning brush 70 may be inhibited from being scattered, a vibration may be inhibited from being transmitted to the grippers 60, and the image forming apparatus 10 may inhibit the occurrence of an image failure.

According to the present exemplary embodiment, as for the contact surface 47, the diameter 40R of the transfer cylinder 40 from the rotation center 40S gradually decreases in the direction toward the upstream portion in the rotation direction B.

In this way, the second engagement depths 47L and 47M may be gradually decreased, unlike the case where the diameter 40R is constant.

According to the present exemplary embodiment, as for the contact surface 47, the difference 47X between the diameter at the upstream end 47A in the rotation direction B and the diameter at the downstream portion 48 is larger than the first engagement depths 48L and 48M.

In this way, the transfer belt 30 and the cleaning brush 70 may be inhibited from coming into contact with the downstream end 41B of the recessed portion 41, unlike the case where the difference 47X between the diameter at the upstream end 47A in the rotation direction B and the diameter at the downstream portion 48 is smaller than the first engagement depths 48L and 48M.

According to the present exemplary embodiment, the transfer cylinder 40 includes the cylinder body 42 and the elastic layer 44 that is wound around the cylindrical surface 42A of the cylinder body 42 and that has the contact surface 47.

In this way, the portion of the transfer cylinder 40 on which the contact surface 47 is formed may be replaceable by replacing the elastic layer 44. In this case, replacement of the elastic layer 44 readily enables the second engagement depths 47L and 47M to be restored to original depths even in the case where the second engagement depths 47L and 47M at the contact surface 47 change over time, for example, in the case where the elastic layer 44 decays over time, unlike the case where the transfer cylinder 40 is composed of a single member.

According to the present exemplary embodiment, as for the elastic layer 44, the distance 47Q between the outer circumferential surface 44A and the cylindrical surface 42A gradually decreases in the direction toward the upstream portion in the rotation direction B in the region in which the contact surface 47 is formed.

In this way, the second engagement depths 47L and 47M may be decreased regardless of the diameter of the cylinder body 42, unlike the case where the distance between the outer circumferential surface 44A of the elastic layer 44 and the cylindrical surface 42A is constant.

First Modification to Formation of Contact Surface 47

Figure 7:
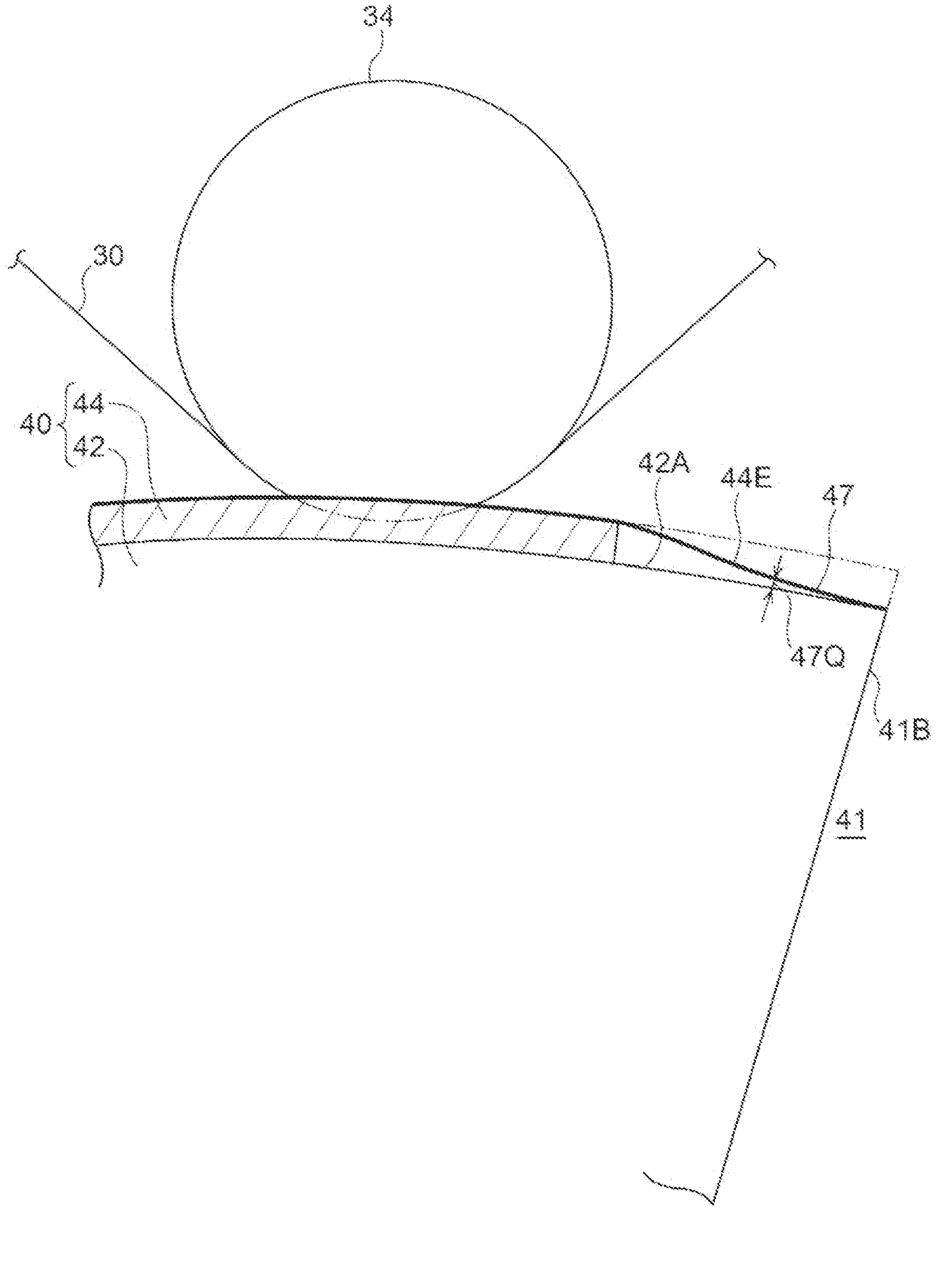
FIG. 7 schematically illustrates an enlarged view of the structure of a first modification.

According to the exemplary embodiment described above, the thickness of the elastic layer 44 gradually decreases in the direction toward the upstream portion in the rotation direction B in the region in which the contact surface 47 is formed, but this is not a limitation. In the case where the elastic layer 44 includes a surface layer 44E as illustrated in, for example, FIG. 7, the surface layer 44E may extend in a direction toward the downstream end 41B of the recessed portion 41, and an upstream end portion of the surface layer 44E in the rotation direction B may be mounted on the cylindrical surface 42A.

In this case, as for the elastic layer 44, the distance 47Q between the outer circumferential surface 44A and the cylindrical surface 42A gradually decreases in the direction toward the upstream portion in the rotation direction B at the region in which the contact surface 47 is formed. For example, the surface layer 44E includes a rubber layer.

Second Modification to Formation of Contact Surface 47

The diameter 42R (see FIG. 4) of the cylinder body 42 may gradually decrease in the direction toward the upstream portion in the rotation direction B in the region in which the contact surface 47 is formed. In this case, as illustrated in, for example, FIG. 8, as for the elastic layer 44, the distance 47Q between the outer circumferential surface 44A and the cylindrical surface 42A is constant also in the region in which the contact surface 47 is formed. As for the elastic layer 44, the distance 47Q between the outer circumferential surface 44A and the cylindrical surface 42A may gradually decrease in the direction toward the upstream portion in the rotation direction B in the region in which the contact surface 47 is formed.

Figure 8:
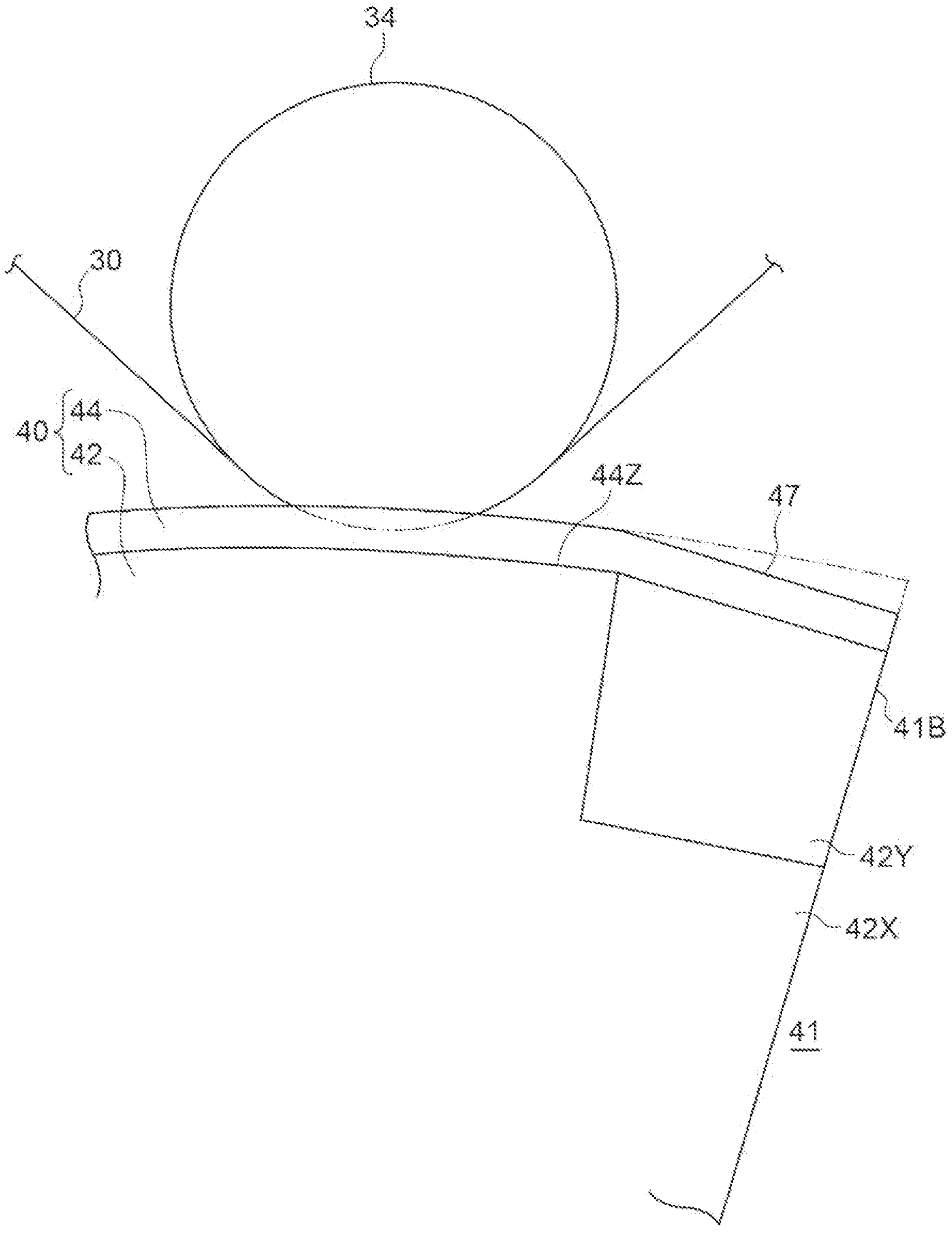
FIG. 8 schematically illustrates an enlarged view of the structure of a second modification.

As illustrated in FIG. 8, the cylinder body 42 may include a cylinder 42X that includes the recessed portion 41 formed on a cylindrical surface 44Z and that rotates in the rotation direction B and a separatable body 42Y that is separably provided on the cylinder 42X in the region in which the contact surface 47 is formed. A portion of the elastic layer 44 on which the contact surface 47 is formed is mounted on the separatable body 42Y.

According to the second modification, the second engagement depths 47L and 47M may be decreased regardless of the thickness of the elastic layer 44, unlike the case where the diameter of the cylinder body 42 is constant in the region in which the contact surface 47 is formed.

According to the second modification, the separatable body 42Y may be replaceable, and the angle of the contact surface 47 may be changeable, unlike the case where the cylinder body 42 is composed of a single member.

According to the second modification, as illustrated in FIG. 8, the cylinder body 42 includes the cylinder 42X and the separatable body 42Y, but this is not a limitation. The cylinder body 42 may be composed of a single member.

Modifications to Rotator, Removing Unit, and Contact Unit

According to the present exemplary embodiment, the transfer cylinder 40 is used as an example of the rotator, but this is not a limitation. Examples of the rotator may include the fixing cylinder 50, a transfer roller, and a transport roller.

According to the present exemplary embodiment, the cleaning brush 70 is used as the removing unit, but this is not a limitation. Examples of the removing unit may include a blade and a cleaning roller for scraping the foreign substances.

According to the present exemplary embodiment, the transfer belt 30 and the cleaning brush 70 are used as examples of the contact unit, but this is not a limitation. Examples of the contact unit may include a transport roller and a transport belt.

Other Modifications

According to the present exemplary embodiment, as for the contact surface 47, the diameter 40R of the transfer cylinder 40 from the rotation center 40S gradually decreases in the direction toward the upstream portion in the rotation direction B, but this is not a limitation. For example, the diameter 40R may stepwise decrease in the direction toward the upstream portion in the rotation direction B.

According to the present exemplary embodiment, as for the elastic layer 44, the distance 47Q between the outer circumferential surface 44A and the cylindrical surface 42A gradually decreases in the direction toward the upstream portion in the rotation direction B in the region in which the contact surface 47 is formed, but this is not a limitation. For example, the distance 47Q may stepwise decrease in the direction toward the upstream portion in the rotation direction B.

According to the present exemplary embodiment, the thickness of the elastic layer 44 gradually decreases in the direction toward the upstream portion in the rotation direction B in the region in which the contact surface 47 is formed, but this is not a limitation. For example, the thickness of the elastic layer 44 may stepwise decrease in the direction toward the upstream portion in the rotation direction B in the region in which the contact surface 47 is formed.

According to the present exemplary embodiment, as for the contact surface 47, the difference 47X between the diameter at the upstream end 47A in the rotation direction B and the diameter at the downstream portion 48 is larger than the first engagement depths 48L and 48M, but this is not a limitation. For example, the difference 47X between the diameter at the upstream end 47A in the rotation direction B and the diameter at the downstream portion 48 may be equal to the first engagement depths 48L and 48M or smaller than the first engagement depths 48L and 48M.

According to the present exemplary embodiment, the transfer cylinder 40 includes the cylinder body 42 and the elastic layer 44 that is wound around the cylindrical surface 42A of the cylinder body 42 and that has the contact surface 47, but this is not a limitation. For example, the transfer cylinder 40 may be composed of a single member.

According to the present exemplary embodiment, as illustrated in FIG. 4, the contact surface 47 is formed at the upstream end portion in the contact range 46 in the rotation direction. In addition to this, the contact surface 47 may be formed on a downstream end portion in the rotation direction in the contact range 46. In this case, the transfer belt 30 comes into contact with the contact surface 47 at the second engagement depth less than the first engagement depth at a portion upstream of the downstream end portion. The cleaning brush 70 comes into contact with the contact surface 47 at the second engagement depth less than the first engagement depth at the portion upstream of the downstream end portion.

The present disclosure is not limited to the exemplary embodiment described above, and various modifications, alterations, and improvements may be made without departing from the spirit thereof. For example, the multiple modifications described above may be appropriately combined.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A rotation device includes a rotator that includes a recessed portion formed on an outer circumferential surface and that rotates in a predetermined rotation direction, a contact unit that comes into contact with a portion of the outer circumferential surface in a range from an upstream end to a downstream end of the recessed portion in the rotation direction at a predetermined engagement depth, and a contact surface that is formed at an upstream end portion in the range in the rotation direction and that comes into contact with the contact unit at a second engagement depth less than a first engagement depth at a portion downstream of the upstream end portion.

(((2)))

As for the rotation device described in (((1))), the contact surface is formed such that a diameter of the rotator from a rotation center gradually or stepwise decreases in a direction toward an upstream portion in the rotation direction.

(((3)))

As for the rotation device described in (((2))), the contact surface is formed such that a difference between the diameter at the upstream end in the rotation direction and the diameter at the downstream portion is larger than the first engagement depth.

(((4)))

As for the rotation device described in any one of (((1))) to (((3))), the rotator includes a rotator body that includes the recessed portion formed on a cylindrical surface and that rotates in the predetermined rotation direction, and a wound portion that is wound around the cylindrical surface in the range and that has the contact surface.

(((5)))

As for the rotation device described in (((4))), and as for the wound portion, a distance between an outer circumferential surface of the wound portion and the cylindrical surface gradually or stepwise decreases in a direction toward an upstream portion in the rotation direction in a region in which the contact surface is formed.

(((6)))

As for the rotation device described in (((4))) or (((5))), a diameter of the rotator body gradually or stepwise decreases in a direction toward an upstream portion in the rotation direction in a region in which the contact surface is formed.

(((7)))

As for the rotation device described in (((6))), the rotator body includes a cylinder that includes the recessed portion on a cylindrical surface and that rotates in the predetermined rotation direction, and a separatable body that is separably provided on the cylinder in the region in which the contact surface is formed, a part of the wound portion on which the contact surface is formed being mounted on the separatable body.

(((8)))

As for the rotation device described in any one of (((1))) to (((7))), the recessed portion contains a holding member that holds a recording medium.

(((9)))

As for the rotation device described in (((8))), the rotator transfers an image to the recording medium with the recording medium that is held by the holding member interposed between the rotator and the contact unit.

(((10)))

As for the rotation device described in any one of (((1))) to (((9))), the contact unit is a removing unit that removes a foreign substance that adheres to the outer circumferential surface.

(((11)))

An image forming apparatus includes the rotation device described in any one of (((1))) to (((10))) and an image forming unit that forms an image to be transferred to the recording medium.

What is claimed is:

1. A rotation device comprising:

a rotator that includes a recessed portion formed on an outer circumferential surface and that rotates in a rotation direction;

a contact unit that comes into contact with a portion of the outer circumferential surface between a downstream end and an upstream end of the recessed portion in the rotation direction at a predetermined engagement depth; and a contact surface that is formed, in the rotation direction, at an upstream end portion of the portion of the outer circumferential surface and that comes into contact with the contact unit at a second engagement depth less than a first engagement depth at a portion downstream of the upstream end portion, wherein the contact surface is an inclined surface having an inclination angle of no less than 5° and no more than 20° with respect to a cylindrical surface of the rotator, and a diameter of the rotator at the contact surface gradually decreases toward the upstream end portion.

2. The rotation device according to claim 1, wherein the contact surface is formed such that a difference between the diameter at an upstream end of the contact surface in the rotation direction and the diameter at the portion downstream of the upstream end portion is larger than the first engagement depth.

3. The rotation device according to claim 1, wherein the rotator includes a rotator body that includes the recessed portion formed on a cylindrical surface and that rotates in the rotation direction, and a wound portion that is wound around the cylindrical surface between the downstream end of the recessed portion and the upstream end of the recessed portion and that has the contact surface.

4. The rotation device according to claim 3, wherein a distance between an outer circumferential surface of the wound portion and the cylindrical surface gradually decreases in a direction toward the upstream end portion in a region in which the contact surface is formed.

5. The rotation device according to claim 3, wherein a diameter of the rotator body gradually decreases in a direction toward the upstream end portion in a region in which the contact surface is formed.

6. The rotation device according to claim 5, wherein the rotator body includes a cylinder that includes the recessed portion on a cylindrical surface and that rotates in the rotation direction, and a separatable body that is separably provided on the cylinder in the region in which the contact surface is formed, a part of the wound portion on which the contact surface is formed being mounted on the separatable body.

7. The rotation device according to claim 1, wherein the recessed portion contains a holding member that holds a recording medium.

8. An image forming apparatus comprising:
the rotation device according to claim 7; and
an image forming unit that forms an image to be transferred to the recording medium.

9. The rotation device according to claim 7,
wherein the rotator transfers an image to the recording medium with the recording medium that is held by the holding member interposed between the rotator and the contact unit.

10. An image forming apparatus comprising:
the rotation device according to claim 9; and
an image forming unit that forms an image to be transferred to the recording medium.

11. The rotation device according to claim 1,
wherein the contact unit is a removing unit that removes a foreign substance that adheres to the outer circumferential surface.

12. A rotation device comprising:
a rotator that includes a recessed portion formed on an outer circumferential surface and that rotates in a rotation direction;
contact means for coming into contact with a portion of the outer circumferential surface between a downstream end and an upstream end of the recessed portion in the rotation direction at a predetermined engagement depth; and
a contact surface that is formed, in the rotation direction, at an upstream end portion of the outer circumferential surface and that comes into contact with the contact means at a second engagement depth less than a first engagement depth at a portion downstream of the upstream end portion, wherein
the contact surface is an inclined surface having an inclination angle of no less than 5° and no more than 20° with respect to a cylindrical surface of the rotator, and
a diameter of the rotator at the contact surface gradually decreases toward the upstream end portion.

* * * * *